United States Patent
Cronin et al.

(10) Patent No.: US 10,077,828 B2
(45) Date of Patent: Sep. 18, 2018

(54) POWERTRAIN SYSTEM FOR MACHINE AND METHOD OF OPERATING SAME

(71) Applicant: Caterpillar Inc., Peoria, IL (US)

(72) Inventors: Michael Cronin, Peoria, IL (US); Kevin Meyer, Germantown Hills, IL (US)

(73) Assignee: Caterpillar Inc., Deerfield, IL (US)

( * ) Notice: Subject to any disclaimer, the term of this patent is extended or adjusted under 35 U.S.C. 154(b) by 88 days.

(21) Appl. No.: 15/131,763

(22) Filed: Apr. 18, 2016

(65) Prior Publication Data

US 2017/0299033 A1    Oct. 19, 2017

(51) Int. Cl.
    *F16H 47/04*    (2006.01)
    *F16H 37/04*    (2006.01)

(52) U.S. Cl.
    CPC .......... *F16H 47/04* (2013.01); *F16H 37/046* (2013.01)

(58) Field of Classification Search
    CPC ............................. F16H 47/04; F16H 37/046
    USPC .................................. 475/72, 73, 81, 82, 83
    See application file for complete search history.

(56) References Cited

U.S. PATENT DOCUMENTS

| | | | | |
|---|---|---|---|---|
| 3,575,066 A * | 4/1971 | Livezey | ................. | B62D 11/18 475/24 |
| 3,815,698 A * | 6/1974 | Reed | ...................... | B62D 11/18 180/6.48 |
| 4,776,233 A * | 10/1988 | Kita | ........................ | F16H 47/04 475/76 |
| 4,976,666 A * | 12/1990 | Meyerle | .............. | F16H 37/0846 475/76 |
| 4,997,412 A * | 3/1991 | Reed | ...................... | B62D 11/18 475/24 |
| 5,052,986 A * | 10/1991 | Jarchow | .................. | F16D 23/06 192/114 T |
| 5,269,732 A * | 12/1993 | Weiss | ................. | B60K 17/3462 475/205 |
| 5,403,241 A * | 4/1995 | Jarchow | .................. | E02F 9/202 475/72 |
| 5,470,285 A | 11/1995 | Schneider et al. | | |
| 5,938,557 A | 8/1999 | Greenwood | | |
| 6,937,931 B2 * | 8/2005 | Funato | .................. | B60W 10/06 60/445 |
| 7,168,997 B2 * | 1/2007 | Ohtsuki | ................. | B63H 23/26 440/5 |
| 7,357,744 B2 | 4/2008 | Dyck et al. | | |
| 7,549,944 B2 * | 6/2009 | Tabata | ................... | B60K 6/365 180/65.7 |

(Continued)

FOREIGN PATENT DOCUMENTS

EP    2955418    12/2015
WO    WO-2004104449 A1 *    12/2004    ............. F16H 47/04

*Primary Examiner* — Roger L Pang
(74) *Attorney, Agent, or Firm* — Mattingly Burke Cohen & Biederman

(57) ABSTRACT

A powertrain system in a machine includes a transmission, and a transmission drive mechanism coupled between the transmission and an engine. The transmission drive mechanism includes a split path architecture where a first input gear receives a torque input from a driveshaft and a second input gear receives a torque input from a variator. The transmission drive mechanism is thereby structured to operate the transmission at a range of speeds that is not dependent upon a speed of the engine, enabling the engine to operate at an engine speed set point or with an optimum engine speed range.

15 Claims, 4 Drawing Sheets

(56) References Cited

U.S. PATENT DOCUMENTS

| | | | |
|---|---|---|---|
| 8,047,941 B2* | 11/2011 | Prebeck | B60K 17/34 475/24 |
| 8,262,530 B2* | 9/2012 | Bailly | F16H 3/728 475/217 |
| 8,298,106 B2* | 10/2012 | Larkin | B62D 11/10 475/24 |
| 8,500,587 B2 | 8/2013 | Du et al. | |
| 8,608,609 B2 | 12/2013 | Sherrill et al. | |
| 8,808,131 B2 | 8/2014 | Seipold et al. | |
| 9,227,618 B2* | 1/2016 | Francesco | F16H 61/4192 |
| 2003/0162618 A1* | 8/2003 | Hasegawa | B60K 5/00 475/72 |
| 2003/0162619 A1* | 8/2003 | Rodeghiero | B60K 17/28 475/73 |
| 2003/0168862 A1* | 9/2003 | Ishizaki | F03D 15/10 290/44 |
| 2004/0209718 A1* | 10/2004 | Ishibashi | B60W 10/103 474/18 |
| 2009/0305840 A1 | 12/2009 | Oliver | |
| 2011/0021303 A1 | 1/2011 | Sich | |
| 2011/0172051 A1 | 7/2011 | Hoffman | |
| 2012/0152056 A1 | 6/2012 | Du et al. | |
| 2017/0305256 A1* | 10/2017 | Bergquist | B60K 6/365 |

\* cited by examiner

POWERTRAIN SYSTEM FOR MACHINE AND METHOD OF OPERATING SAME

TECHNICAL FIELD

The present disclosure relates generally to machine powertrains, and more particularly to a transmission drive mechanism structured to vary transmission input speeds in a manner that is decoupled from engine speed.

BACKGROUND

A great many different powertrain systems are well-known and widely used. Mechanical, hydro-mechanical, electric, hybrids of these and still others have been the subject of engineering research and commercial production for many years. In a conventional powertrain architecture for mobile machines, a transmission is positioned functionally between an engine and a final drive. The transmission in general provides different gear ratios or continuously variable effective gear ratios between the engine and the final drive.

In a conventional mechanical automatic transmission a plurality of gear sets are coupled between input and output shafts of the transmission, and torque transfer through the transmission switches among the gear sets depending upon conditions. In a hydro-mechanical transmission, a hydraulic pump typically driven by way of engine power is coupled with and supplies fluid to a hydraulic motor that in turn applies torque to a final drive or individual wheels or tracks. Over the years, engineers have proposed a great many variations on these and other basic transmission types. Commonly owned U.S. Pat. No. 8,808,131 to Seipold et al. is directed to a Multi-Range Hydro-Mechanical Transmission. Seipold proposes a design where a continuously variable transmission has multiple planetary gear sets, and a variator drives a ring gear of one of the planetary gear sets. Clutches are coupled between output shafts of the transmission and drive gears.

SUMMARY

In one aspect, a powertrain system for a machine includes a transmission having a transmission input shaft, a transmission output shaft, and a plurality of transmission gears coupled between the transmission input shaft and the transmission output shaft. The system further includes a transmission drive mechanism coupled with the transmission and including an incoming driveshaft, a variator, and a planetary gear train having a first rotatable input element, a second rotatable input element, and a rotatable output element structured to drive the transmission input shaft. The first rotatable input element being structured to receive a first torque input from the incoming driveshaft, the second rotatable input element being structured to receive a second torque input from the variator, and the rotatable input element being coupled with each of the first and the second torque inputs in the driving of the transmission input shaft.

In another aspect, a machine includes a frame and a plurality of ground-engaging propulsion elements coupled to the frame, and a powertrain system coupled to the frame and including an engine, a transmission, and a transmission drive mechanism. The transmission drive mechanism is structured to rotate an input shaft of the transmission at a range of speeds decoupled from a speed of rotation of the engine. The transmission drive mechanism includes an incoming driveshaft coupled with the engine, a planetary gear train including a rotatable output element coupled with the transmission, and a variator. The transmission drive mechanism further includes a first torque input coupling between the incoming driveshaft and the planetary gear train, and a second torque input coupling between the variator and the planetary gear train.

In still another aspect, a method of operating a powertrain system in a machine includes rotating a first input element in a planetary gear train by way of an incoming driveshaft rotating at a driveshaft speed determined by an engine speed in the machine. The method further includes rotating a second input element in the planetary gear train by way of a variator rotating at a first variator speed not determined by the engine speed. The method further includes operating the planetary gear train so as to rotate an input shaft of a transmission by way of torque from each of the first and the second input elements to produce a first transmission input speed while the engine operates at the engine speed. The method still further includes rotating the second input element by way of the variator rotating at a second variator speed not determined by the engine speed, and operating the planetary gear train so as to rotate the input shaft by way of torque from each of the first and second input elements to produce a second transmission input speed while the engine operates at the engine speed.

DETAILED DESCRIPTION

Figure 1:
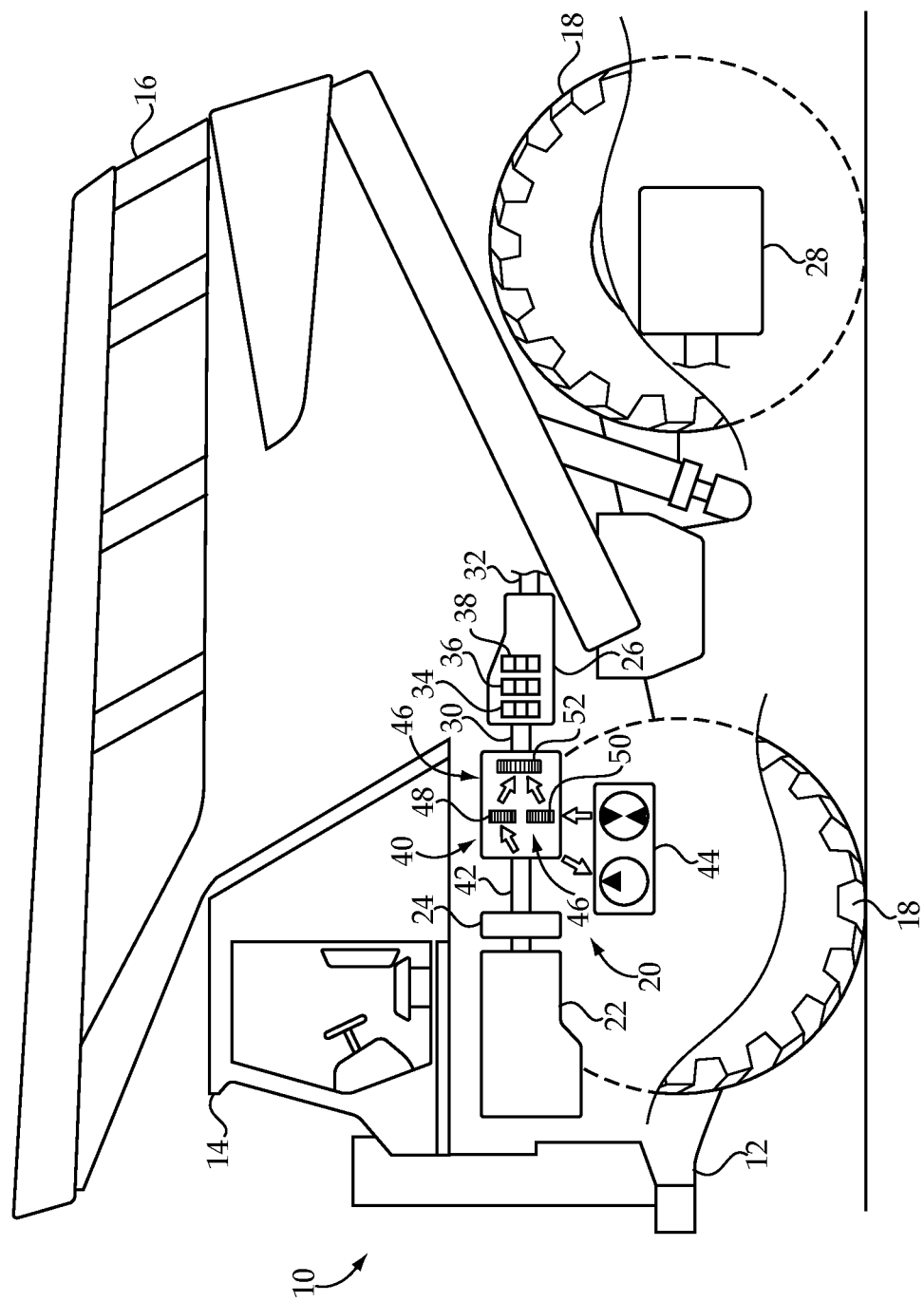
FIG. 1 is side diagrammatic view of a machine having a powertrain system, according to one embodiment.

Referring to FIG. 1, there is shown a machine 10 according to one embodiment, and including a frame 12 and a plurality of ground-engaging propulsion elements 18 coupled to frame 12. Machine 10 further includes a cab 14 mounted to frame 12, and a dump bed 16. In the illustrated embodiment machine 10 is shown as a mining truck, however, the present disclosure is not limited as such and different types of construction or mining machinery and still other equipment could benefit from the teachings set forth herein. Machine 10 may be a wheeled machine as shown, but could additionally or alternatively have tracks in other instances. Machine 10 further includes a powertrain system 20 coupled with frame 12 and structured to provide drive power to ground-engaging elements 18. A final drive 28 is also shown in FIG. 1, and could include a back differential, axles, and other conventional hardware. Powertrain system 20 includes an engine 22 coupled with a torque converter 24 that transfers torque to a transmission 26 by way of a transmission drive mechanism 40. In a practical implementation strategy transmission 26 includes a plurality of transmission gears 34, 36, and 38 coupled between a transmission input shaft 30 and a transmission output shaft 32 coupled with final drive 28. As will be further apparent from the following description machine 10 may be uniquely structured by way of the architecture and components of powertrain system 20 to operate transmission input shaft 30 at a range of speeds decoupled from a speed of rotation of engine 22.

To this end, transmission drive mechanism 40 is coupled with transmission 26 and may include an incoming driveshaft 42 coupled with torque converter 24 and typically rotated at a speed that is the same as a speed of rotation of engine 22, or a speed that is reduced a consistent amount by way of torque converter 24. In a practical implementation strategy torque converter 24 can function as a gear reduction mechanism that produces an output speed that is more or less at a fixed ratio of the engine speed, such as about 50% of the engine speed in some instances. Torque converter 24 may include a lockup torque converter structured to lock up at a speed of about 3-5 miles per hour in certain instances after operating conventionally at initial launch when machine 10 starts from a stop.

Drive mechanism 40 further includes a variator 44, a planetary gear train 74 having a first rotatable input element 48, a second rotatable input element 50, and a rotatable output element 52 structured to drive transmission input shaft 30. Input element 48 is structured to receive a first torque input from driveshaft 42, and input element 50 is structured to receive a second torque input from variator 44. Output element 52 is coupled with each of input elements 48 and 50, such that planetary gear train 46 combines the first and the second torque inputs in the driving of transmission input shaft 30. As further discussed herein, the structure of drive mechanism 40 provides a first torque input coupling between incoming driveshaft 42 and planetary gear train 46, and a second torque input coupling between variator 44 and planetary gear train 46. In FIG. 1 block arrows illustrate schematically a path for transmitting torque from driveshaft 42 to input shaft 30 by way of input element 48 and output element 52, and another path for transmitting torque from driveshaft 42 to input shaft 30 by way of variator 44, input element 50, and output element 52. As used herein, a variator should be understood as a power transmission mechanism that can change its output in a continuous ratio. Example variators according to the present disclosure can include a hydraulic variator having a hydraulic pump coupled with a hydraulic motor, an electric motor variator, or certain purely mechanical drive mechanisms.

Figure 2:
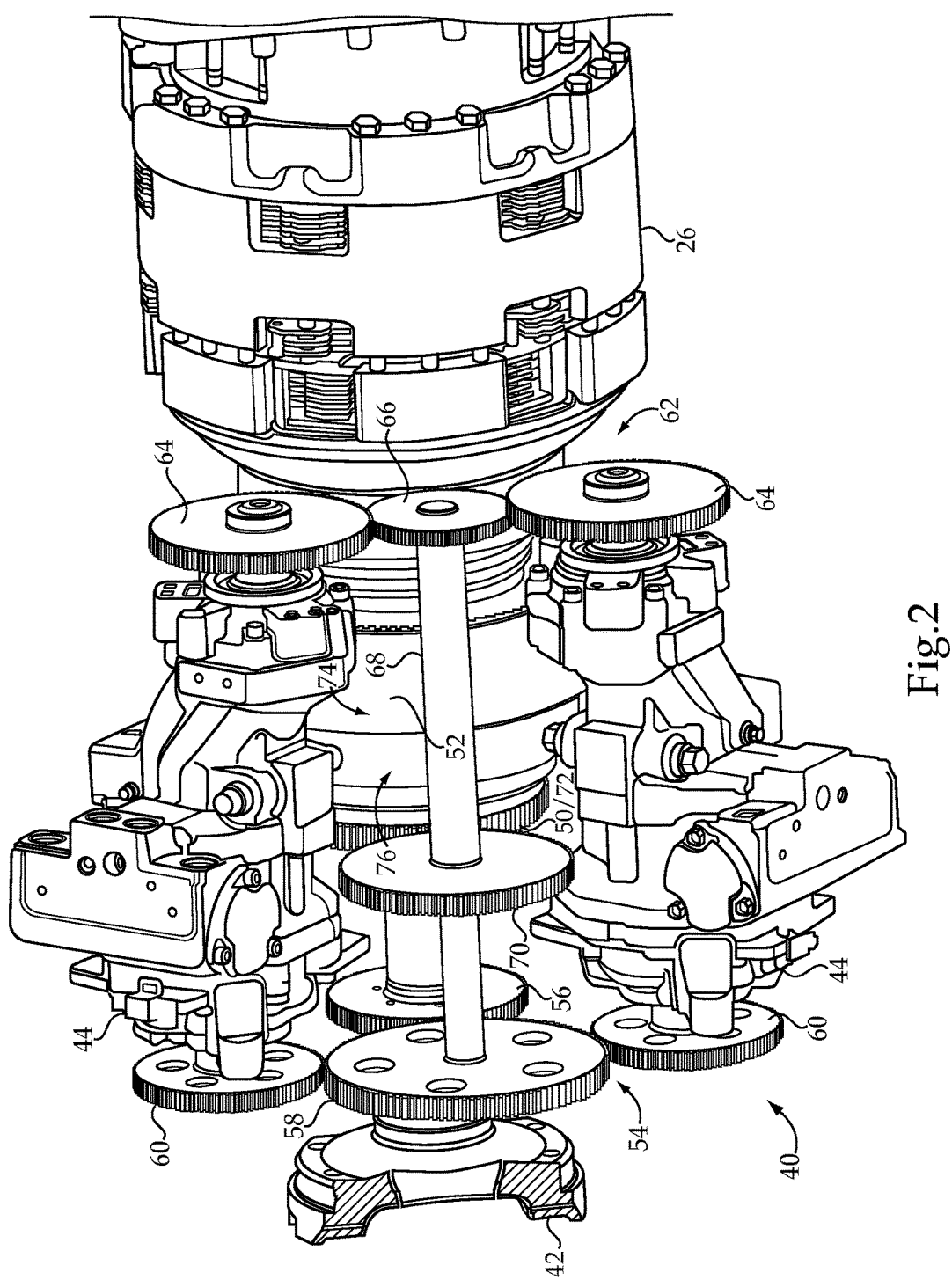
FIG. 2 is diagrammatic view of a powertrain system, according to one embodiment.
Figure 3:
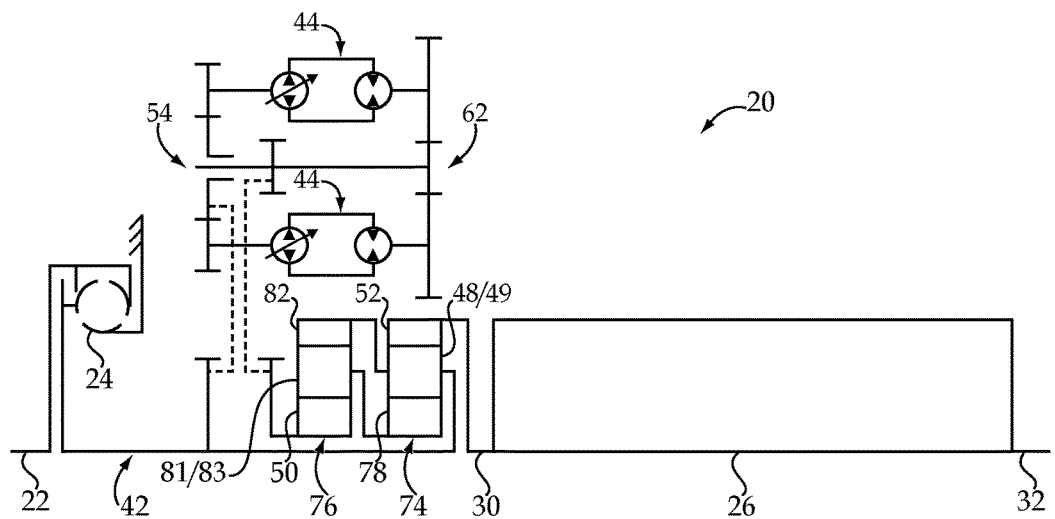
FIG. 3 is a schematic view of a powertrain system, according to one embodiment.

Referring also now to FIGS. 2 and 3, there are shown additional features of powertrain system 20 in greater detail and schematically, respectively. In the illustrated embodiment, system 20 includes two variators 44, each of which includes a variator input gear 60 coupled with driveshaft 42 by way of a pump gear train 54 that includes a first pump drive gear 56 carried upon driveshaft 42 and a second pump drive gear 58 coupled between gears 56 and 60 so as to operate variators 44 by way of rotating driveshaft 42. Each of variators 44 may include a hydraulic pump coupled with the corresponding variator input gear 60, and a hydraulic motor coupled with the corresponding hydraulic pump. The hydraulic pumps will typically have a variable displacement such that an output speed of the variator can be varied independent of a speed of driveshaft 42. In some instance, a brake (not shown) could be coupled with motor shafts of variators 44. As further discussed below, the first torque input coupling between driveshaft 42 and gear train 74 can include or be a part of a mechanical coupling. The coupling of variators 44 with driveshaft 42 enables the second torque input coupling to include or be a part of a hydro-mechanical coupling between driveshaft 42 and gear train 74.

Also shown in FIG. 2 is a motor gear train 62 including motor drive gears 64 coupled with motors of variators 44, and a common driven gear 66 coupled with a shaft 68. Shaft 68 is in turn coupled to a driving gear 70 that is coupled with a gear assembly comprised of a gear element 72 and a gear element that can include rotatable input element 50. From the following description it will be appreciated that various of the components of system 20 may be coupled to rotate together, thus the element that is fairly understood as a rotatable input element 48, 50, or a rotatable output element 52 is to be broadly construed, and in either case can be a component that is driven by another component within one of the several gear trains typically included in drive mechanism 40. As gear train 62 is coupled between the first and second variators 44, gear 62 can combine or merge torques produced by each of gears 64. The combined torques are transmitted by way of shaft 68 to gear 70, and thenceforth to components of gear set 76.

Figure 4:
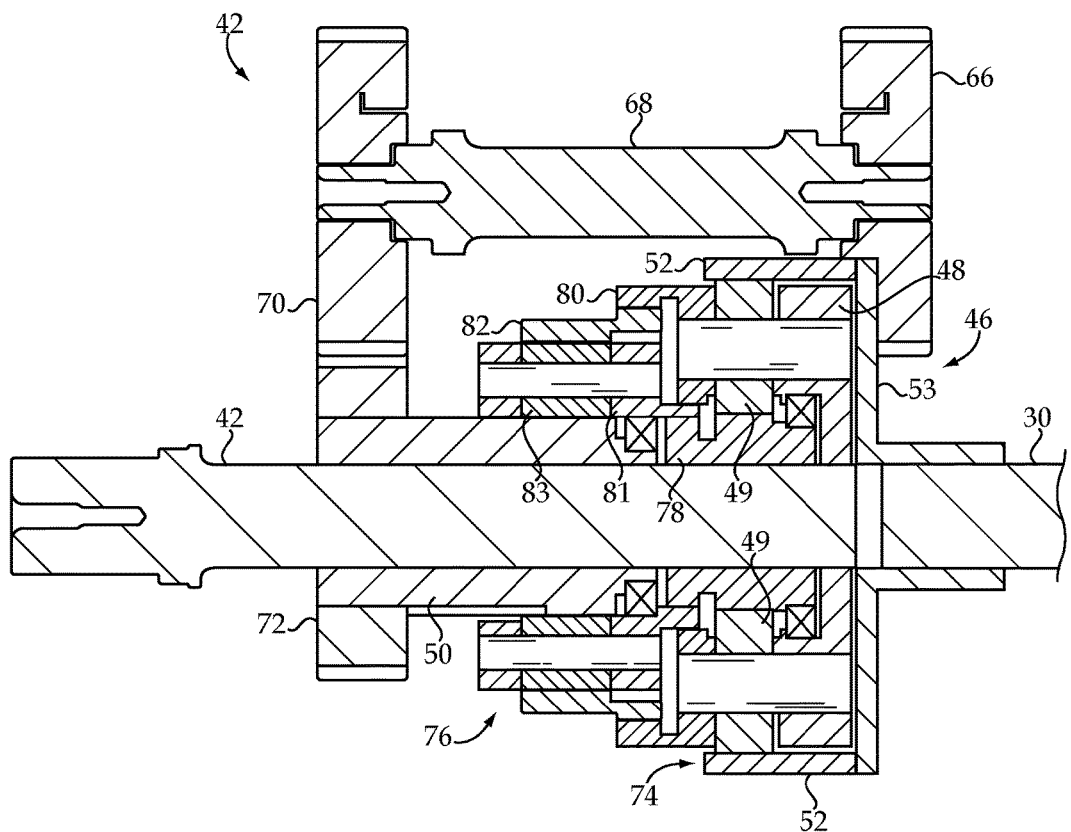
FIG. 4 is a partially sectioned side diagrammatic view of a portion of a powertrain system, according to one embodiment.

Referring also now to FIG. 4, there is shown a sectioned view through a part of drive mechanism 40. It can be seen that gear 70 is coupled with shaft 68, and with gear element 72, in turn coupled with element 50. Shaft 66 will receive a torque input from variators 44. As suggested above, any or all of elements 70, 72, or 50 as labeled in FIG. 4, or still others, could be understood as a second rotatable input element structured to receive a torque from a variator. Analogous definitions of the first rotatable input element and rotatable output element are intended. In a practical implementation strategy, at least one of first and second rotatable input elements 48 and 50 as contemplated herein includes a sun gear or a carrier. A great many different designs for connecting among components in one or more planetary gear trains may be conceived, however, within the scope of the present disclosure. In a further practical implementation strategy rotatable output element 52 includes a ring gear.

In the illustrated embodiment, planetary gear train 46 includes a first planetary gear set 74 that includes first rotatable input element 48. Also in the illustrated embodiment, element 48 includes or is attached to the carrier for a plurality of planet gears 49 of planetary gear set 74. Driveshaft 42 is rotatable relative to a sun gear 78 of gear set 74. A torque transfer component 80 that includes or is attached to the carrier for planet gears 49 rotates with planet gears 49 as they rotate about sun gear 78. Component 80 transfers torque to or from a ring gear 82 of a second planetary gear set 76 of gear train 46. A plurality of planet gears 83 are rotatable between ring gear 82 and a sun gear comprised by rotatable input element 50. Input element 50 is rotatable relative to driveshaft 42. A carrier 81 transfers torque between planet gears 83 and sun gear 78. Rotatable output element 52 is shown in the form of a ring gear 52 of first planetary gear set 74 that conveys a driving torque to transmission input shaft 30 by way of an input element 53.

From the FIG. 4 illustration, it can be seen that the present disclosure contemplates two torque inputs that are merged to provide one torque output to transmission input shaft 30. It can also be noted that two torque transmission paths between first planetary gear set 74 and second planetary gear set 76 are provided by way of the coupling of element 80 with ring gear 82 and the coupling of carrier 81 with sun gear 78. As alluded to above there are numerous different design strategies for inputting multiple torques to one or more planetary gear sets to provide one output torque. Likewise, there are various different pathways whereby torque can be transferred between two planetary gear sets in a transmission drive mechanism. Factors including system ruggedness and robustness, the extent of speed reduction between an engine and a transmission input shaft, and the range of speeds it is desired to provide as an input to a transmission will bear upon the particular physical configuration that is selected. It will typically also be desirable to operate engine 22 within a relatively narrow speed range for purposes of efficiency and emissions control and/or management, at least much of the time. Thus, the desired engine speed operating point can bear on factors such as the numbers of gear teeth in certain gears, for example. Still other benefits from operating an engine with reduced or minimal speed fluctuations can include reduced noise, prolonged engine life, reduced lubricant consumption, for example.

Figure 5:
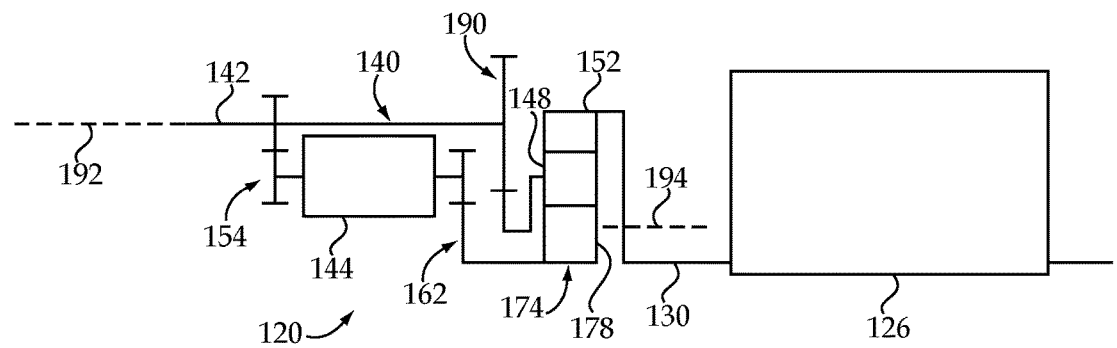
FIG. 5 is a schematic view of a powertrain system, according to another embodiment.

FIG. 5 presents one alternative embodiment where a transmission drive mechanism 140 is used in a powertrain system 120 having a different architecture than that previously described. In system 120 an incoming driveshaft 142 may be coupled with a pump gear train 154 to drive a variator 144 or potentially two variators 144. Each variator 144 may have a configuration similar to that used in the foregoing embodiment. An output or motor gear train 162 is structured to provide a torque input to a planetary gear train or set 174. Another gear train 190 is coupled between incoming driveshaft 142 and planetary gear set 174. A transmission input shaft 130 is driven by way of planetary gear set 174 to drive a transmission 126. Incoming driveshaft 142 defines an axis of shaft rotation 192, and planetary gear set 174 defines a center axis of gear rotation. In the illustrated embodiment, gear set 174 includes a sun gear 178, a set of planet gears and a carrier 148, and a ring gear 152. Sun gear 178 receives the torque input from variator(s) 144, whereas carrier 148 receives the torque input from gear train 190. It can be noted that axis 194 is offset from axis 192, and that gear train 190 compensates for the offset. Apart from the offset axes, powertrain system 120 may also differ from powertrain system 20 described above in that only a single planetary gear set is used.

Figure 6:
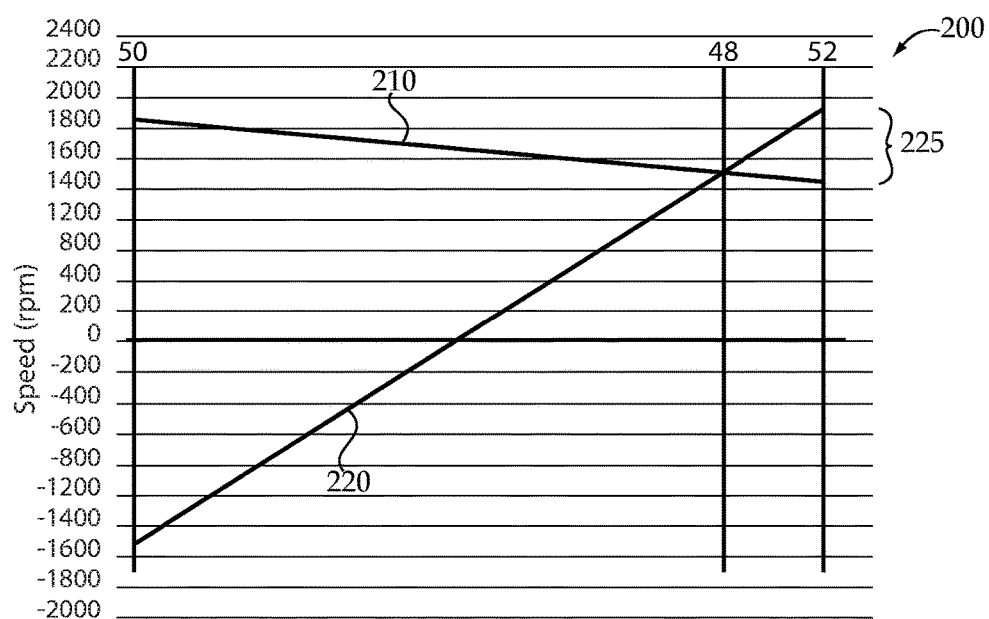
FIG. 6 is a nomograph illustrating relationships among parameters in a powertrain system according to the present disclosure.

Referring now to FIG. 6, there is shown a nomograph 200 illustrating example relationships among certain parameters according to the present disclosure. In FIG. 6 speed is shown along the vertical axis. Line 210 can be understood as a start line indicating a slowest part of a speed range, and line 220 can be understood as an end line indicating a highest part of a speed range. Vertical line 50 is the component of the planetary gear train that is driven by one or more variators such as input element 50. Vertical line 52 is the component of the planetary driving the input to the transmission such as input element 52, and vertical line 48 is the piece of the planetary driven by the engine such as input element 48. It can be seen from FIG. 6 that a variator speed of about −1600 rpm (line 50) might correspond to a transmission input speed (line 52) of about 1900 rpm and an engine speed (line 48) of about 1500 rpm. Under similar conditions a variator speed of about 1900 rpm might correspond to a transmission input speed of about 1400 rpm and the engine speed of about 1500 rpm. A range 225 is about a 35% step. Gear ratios in certain transmissions advantageously used in the context of the present disclosure may be about 1:1.35, thus general speed ranges and structures of a planetary gear set suitable for one particular application can be deduced from the FIG. 6 nomograph. Where a different transmission ratio were of interest the nomograph could appear somewhat different. Another way to understand these principles is that the present disclosure provides a strategy for obtaining a desired range of speed inputs to a transmission based upon a fixed engine speed and a variable variator speed.

INDUSTRIAL APPLICABILITY

Referring to the drawings generally, but in particular reference to the embodiment of FIGS. 1-4, operating powertrain system 20 may include rotating first input element 48 by way of incoming driveshaft 42 while rotating driveshaft 42 at a driveshaft speed that is determined by an engine speed in machine 10. Second input element 50 can be rotated by way of variator(s) 44, while rotating at a first variator speed not determined by the engine speed. As described herein, variator(s) 44 can be operated through a range of speeds by varying pump displacement without any adjustment in engine speed. Planetary gear train 46 can be operated so as to rotate input shaft 30 of transmission 26 by way of torque from each of first and second input elements 48 and 50 while engine 22 operates at the desired engine speed.

So long as machine 10 is traveling at a constant speed on a level grade, for example, the foregoing speed relationships may continue. When it is desirable to change a speed of machine 10, or for another reason change a speed of transmission input shaft 30, variator pump displacement can be varied such that input element 50 is rotated at a second variator speed not determined by engine speed. If machine 10 is accelerating, the second variator speed might be greater than the first variator speed, and if decelerating the second variator speed might be less than the second variator speed. As variator speed changes, planetary gear train 46 can be operated so as to rotate input shaft 30 by way of torque from each of first and second input elements 48 and 50 to produce a second transmission input speed while engine 22 operates at the engine speed.

The foregoing example operation enables transmission input speed to be varied through a range sufficient to shift through a full range of gears in machine 10 without any substantial variation in a speed of engine 22. Those skilled in the art will appreciate that this technique differs from earlier strategies where engine speed had to be varied through, for example, a speed range of about 35% to shift through each gear. In other words, rather than needing to speed an engine up or slow the engine down by about 35%, or another generally fixed amount, to obtain a 35% speed change in the transmission input speed the speed change can be obtained by way of a variable input from variators. Those skilled in the art will also be familiar with the desirability, as provided by the present disclosure, of the capability to minimize fluctuations in engine speed to enable an engine to operate at a relatively stable operating point to obtain advantages respecting emissions, improved efficiency, and others as noted above.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon examination of the attached drawings and appended claims.

What is claimed is:

1. A powertrain system for a machine comprising:
   a transmission including a transmission housing, a transmission input shaft, a transmission output shaft, and a plurality of transmission gears coupled between the transmission input shaft and the transmission output shaft; and
   a transmission drive mechanism coupled with the transmission and positioned outside of the transmission housing, the transmission drive mechanism including an incoming driveshaft, a first variator and a second variator, a variator output shaft coupled with the first variator and the second variator, and a planetary gear train, the planetary gear train having a first planetary gear set including a first rotatable input element, a second planetary gear set including a second rotatable input element, and a rotatable output element structured to drive the transmission input shaft;

the first rotatable input element being structured to receive a first torque input from the incoming driveshaft and fixed to rotate at a fixed speed ratio with the incoming driveshaft;

the second rotatable input element being structured to receive a second torque input applied to the second rotatable input element by way of the variator output shaft; and the rotatable output element being coupled with each of the first and the second rotatable input elements, such that the planetary gear train combines the first and the second torque inputs in the driving of the transmission input shaft.

2. The system of claim 1 wherein each of the first variator and the second variator includes a variator input gear coupled with the incoming driveshaft so as to operate the first variator and the second variator by way of rotating the incoming driveshaft.

3. The system of claim 2 wherein each of the first variator and the second variator includes a hydraulic pump coupled with the corresponding variator input gear, and a hydraulic motor coupled with the hydraulic pump.

4. The system of claim 3 wherein the hydraulic pump has a variable displacement.

5. The system of claim 4 further comprising a second gear train coupled between the first and the second variators and the second rotatable input element and structured to combine output torques of each of the first and the second variators to produce the second input torque.

6. The system of claim 5 wherein the first input element includes a carrier coupled with a set of planet gears in the planetary gear train, and the second input element includes a sun gear in the planetary gear train.

7. The system of claim 1 wherein at least one of the first and the second rotatable input elements includes a sun gear or a carrier.

8. The system of claim 2 wherein the first planetary gear set includes the rotatable output element.

9. The system of claim 8 wherein the rotatable output element includes a ring gear.

10. A machine comprising:
a frame;
ground engaging propulsion elements coupled to the frame;
a powertrain system coupled to the frame and including an engine, a transmission having a transmission housing, and a transmission drive mechanism positioned outside of the transmission housing and structured to rotate an input shaft of the transmission at a range of speeds decoupled from a speed of rotation of the engine;
the transmission drive mechanism including an incoming driveshaft coupled with the engine, a planetary gear train including a first planetary gear set, a second planetary gear set, a rotatable output element coupled with the transmission, a first variator, a second variator, and a variator output shaft coupled with the first variator and the second variator;
the transmission drive mechanism further having a first torque input coupling between the incoming driveshaft and the first planetary gear set and including a first rotatable input element fixed to rotate at a fixed speed ratio with the incoming driveshaft, and a second torque input coupling between the variator output shaft and the second planetary gear set and including a second rotatable input element; and
the rotatable output element being coupled with each of the first and the second rotatable input elements, such that the planetary gear train combines the first and the second torque inputs in the driving of the transmission input shaft.

11. The machine of claim 10 wherein each of the first variator and the second variator is coupled with the incoming driveshaft.

12. The machine of claim 11 wherein the first torque input coupling is a part of a mechanical coupling between the incoming driveshaft and the planetary gear train, and the second torque input coupling is a part of a hydromechanical coupling between the incoming driveshaft and the planetary gear train.

13. The machine of claim 12 wherein each of the first variator and the second variator includes a hydraulic variator having a variable displacement pump.

14. The machine of claim 10 wherein the transmission drive mechanism further includes a plurality of torque transfer couplings between the first planetary gear set and the second planetary gear set.

15. The machine of claim 10 wherein the incoming driveshaft defines an axis of shaft rotation, and the planetary gear train defines a center axis of gear rotation that is offset from the axis of shaft rotation, and further including at least one gear coupled between the incoming driveshaft and the planetary gear train and compensating for the offset.

* * * * *